United States Patent Office 3,045,380
Patented July 24, 1962

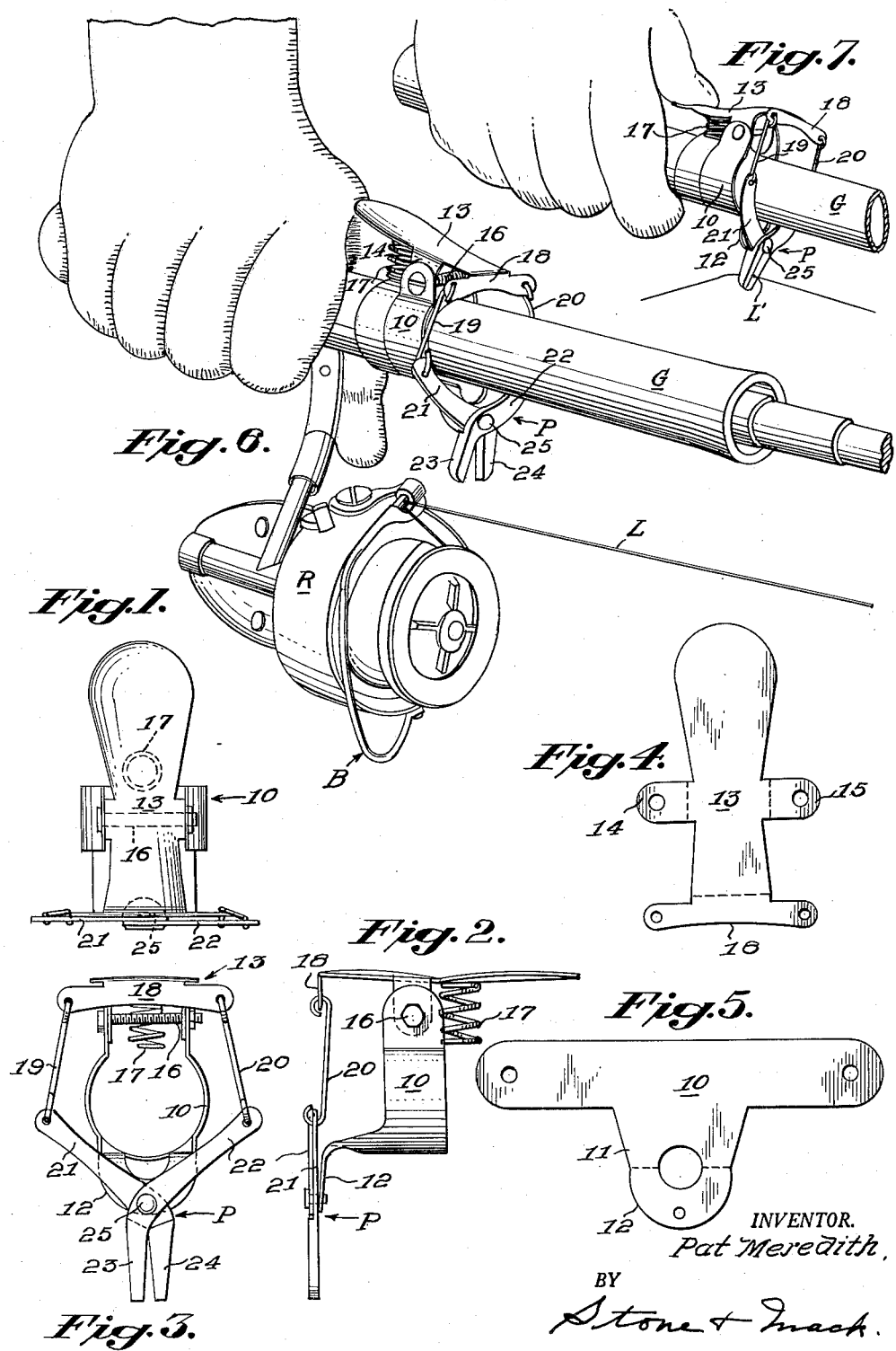

3,045,380
FISHING LINE BRAKE FOR SPINNING REELS
Pat Meredith, Rowena, Ky.
Filed Nov. 14, 1960, Ser. No. 68,710
1 Claim. (Cl. 43—25)

This invention relates to an attachment for a fishing rod. More particularly it pertains to a thumb operated line-holding attachment for use in conjunction with an open-face spinning reel.

Customarily, in using an open-face spinning reel a fisherman holds the grip of the rod in one hand. The line is customarily one of the type known as a "Monofilament" line. With the forefinger of the same hand he picks up the line slightly ahead of the reel. He flips the bail, forming a part of the reel, to release the line. He then raises the tip of the rod back over his shoulder in the customary manner, casts the line and bait forward, his index finger releasing the line at the appropriate moment. In fishermen's parlance he is "fingering" the line.

The Monofilament line mentioned above is quite fragile. By reason of this fragility, any mechanical device must be delicate in its contact with the fishing line. Applicant's device will successfully finger the fishing line without in any way injuring or weakening the line.

It is thus an object of this invention to provide a fishing rod attachment for use with an open-face spinning reel which will perform this fingering operation mechanically without injury to the line.

It is another object to provide such an attachment which is thumb operated.

These and other objects will become more apparent in the following more complete description and drawings wherein like reference characters refer to like parts throughout.

FIG. 1 is a top plan view of the line holding attachment;

FIG. 2 is a side elevation of the attachment;

FIG. 3 is a front elevational showing which indicates how the attachment appears when viewed from the tip end of the fishing rod;

FIG. 4 shows the thumb release stamping before the ears and the bridge thereof are bent downwardly into shape;

FIG. 5 is another stamping, this one being the clamp which supports the thumb release and the line pincers;

In FIG. 6 the line holding attachment is shown in a perspective view as it appears when mounted on a rod adjacent the reel. The jaws of the attachment are held open by the thumb release spring;

FIG. 7 is another perspective view similar to FIG. 6 showing the pincer jaws closed in line-engaging position.

The attachment is essentially a thumb-operated pincer or plier line holder having three main parts, of which two are metal stampings, and one is a miniature pair of pincers or pliers.

One of the stampings is the clamp 10 which wraps around the grip G of a fishing pole ahead of the reel R. An appendage 11 extends from one side of this clamp, a portion 12 of which is bent downwardly to support the line pincers P at their pivot more particularly described below.

A second stamping 13 is the thumb release member. It has two ears 14 and 15 which are bent down for pivotal connection to the clamp 10 by pintle 16. A return spring 17 between the thumb engaging portion of the thumb release and the grip normally holds this release in its uppermost position (FIG. 6). At the front of this stamping 13 and integral with it is a bridge member 18 which extends transversely across the end of the stamping. There is a hole in each end of the bridge for wire hangers 19 and 20 which operate the handles of the pincers P. One hanger depends downwardly adjacent one side of the rod grip, and the other hanger depends downwardly adjacent the other side of the rod grip.

The line pincers P have handles 21 and 22 and line grasping jaws 23 and 24. These pincers pivot on a bolt 25. Bolt 25 passes through the pincers and on through appendage 11, functioning as both a support and a pivot.

Operation

Assuming that the bail B is turned in the proper direction to lock the line L, the line is picked up by the fisherman at point L' and placed between the jaws of the pincers. The jaws are then closed by pressing down with the thumb as shown in FIG. 7. The bail is set to free the line for casting. The line is thus held between the pincers until such time as the fisherman deliberately releases his thumb in the course of a cast.

What is claimed is:

A thumb operated line holding fishing rod attachment for use in conjunction with an open-face spinning reel comprising a thumb release having two downwardly projecting ears with openings therethrough, a pair of line pincers comprising two elongated pivotally interconnected crossed members having opposed handle portions and line gripping jaw portions, a clamp for supporting said thumb release and said line pincers on a fishing rod, a pintle engaging said clamp and said ears for pivotally supporting the thumb release, a bridge extending transversely across one end of said thumb release, wire hangers operationally connecting the ends of said bridge with the handles of said line pincers so that pivotal movement of said thumb release toward said fishing rod will draw said handles toward each other to cause said jaws to approach each other to grip a line therebetween.

References Cited in the file of this patent

UNITED STATES PATENTS

| 680,322 | Faust | Aug. 13, 1901 |
| 1,709,436 | Koester | Apr. 16, 1929 |
| 2,804,711 | Kozar | Sept. 3, 1957 |

FOREIGN PATENTS

| 1,176,849 | France | Nov. 24, 1958 |